No. 674,464. Patented May 21, 1901.
J. E. HAUSFELD.
STOVE.
(Application filed Dec. 3, 1900.)
(No Model.)
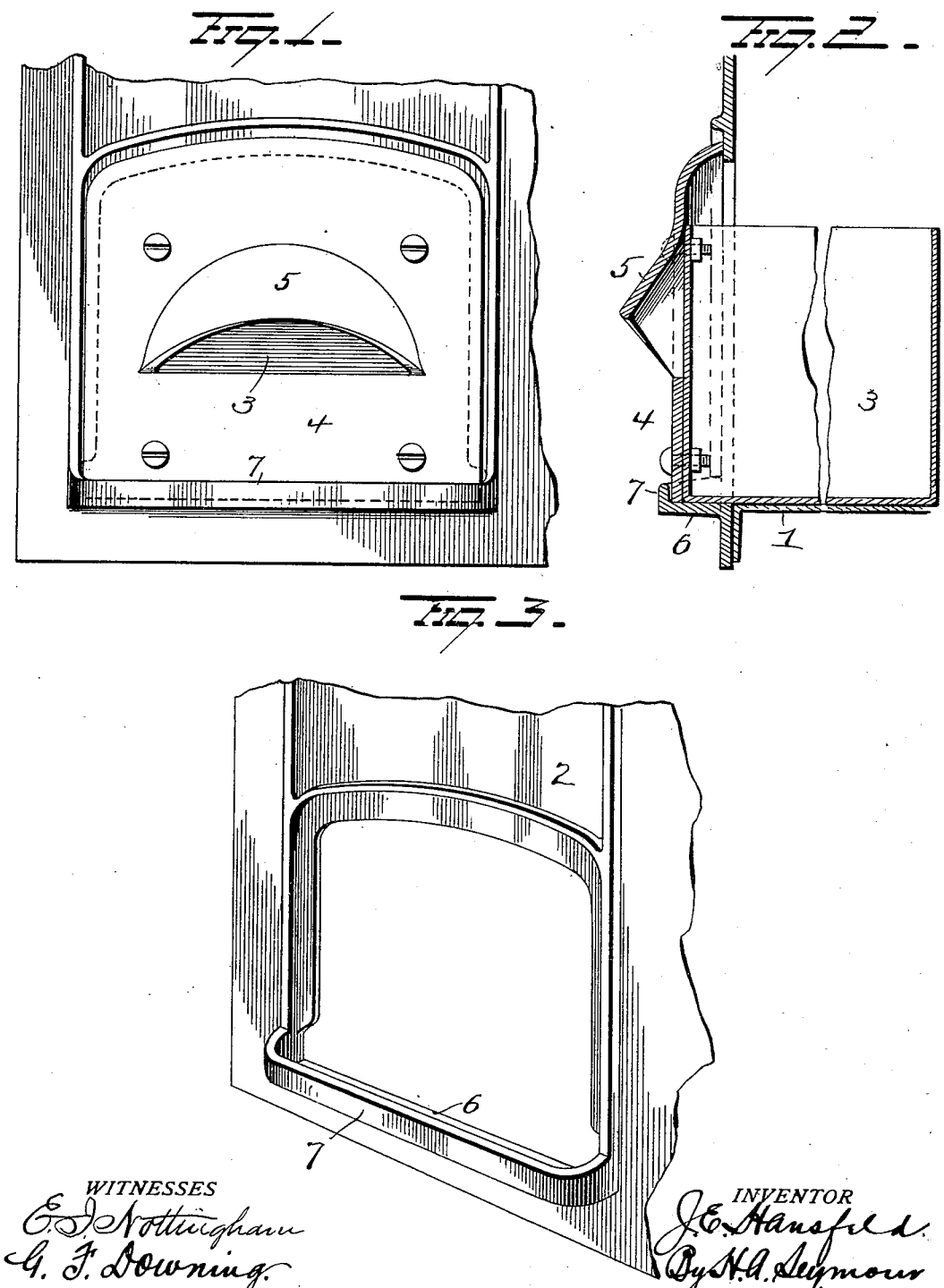
WITNESSES
INVENTOR
Attorney

UNITED STATES PATENT OFFICE.

JOSEPH E. HAUSFELD, OF CINCINNATI, OHIO, ASSIGNOR TO ERNST H. HUENEFELD, OF SAME PLACE.

STOVE.

SPECIFICATION forming part of Letters Patent No. 674,464, dated May 21, 1901.

Application filed December 3, 1900. Serial No. 38,555. (No model.)

*To all whom it may concern:*

Be it known that I, JOSEPH E. HAUSFELD, of Cincinnati, in the county of Hamilton and State of Ohio, have invented certain new and useful Improvements in Stoves; and I do hereby declare the following to be a full, clear, and exact description of the invention, such as will enable others skilled in the art to which it appertains to make and use the same.

My invention relates to an improvement in stoves, and more particularly to an improved ash-pan casing, the object of the invention being to provide improved means for holding the pan in position in the stove and prevent drawing of ashes out onto the floor when the pan is removed.

With this object in view the invention consists in certain novel features of construction and combinations and arrangements of parts, as will be more fully hereinafter described, and pointed out in the claims.

In the accompanying drawings, Figure 1 is a view of a portion of a stove illustrating my improvements. Fig. 2 is a view in section of the same, and Fig. 3 is a view with the pan removed.

1 represents an ash-pan casing, and 2 the front of the stove forming the front of said casing and made with an opening for the admission and withdrawal of the ash-pan 3. The latter is preferably made rectangular in general shape to conform to the interior of the casing and is provided on its front with a plate 4, curved rearward at its top and side edges to fit snugly against the stove-front and slit horizontally, as shown, the plate above said slit bulged outward to form a handle 5 to facilitate the removal of the pan 3 from its casing.

The front 1 is provided at the lower edge of the opening for the ash-pan with an outwardly-projecting lip 6, having an upwardly-projecting flange 7 on the outer edge thereof for a purpose which will now be explained. The lip 6 is of approximately the shape of the outer end of pan 3 with the plate 4 thereon, so as to permit the latter to fit behind flange 7 and be retained in the casing thereby, and when the pan 3 is drawn out of the casing it is necessary to lift the outer end thereof slightly, so as to permit the pan to be drawn over the flange 7, and the latter will as the pan is withdrawn scrape the bottom thereof and prevent ashes from being drawn out onto the floor and will also catch any ashes which may collect beneath the pan and would otherwise be drawn out with the same.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a stove, the combination with an ash-pan casing having an opening in its wall, a lip projecting outwardly from the lower edge of said opening and a flange projecting upwardly from the free edge of said lip, of an ash-pan to enter said casing, a front plate on said pan and having a bearing against the outer face of said casing so as to close the opening therein, the lower end of said front plate resting upon the outwardly-projecting lip and within the flange thereon.

2. In a stove, the combination with an ash-pan casing having an opening in its wall, of an ash-pan, a front plate on said pan adapted to bear against the outer wall of the casing and close the opening therein, a portion of said front plate bulged outwardly and forming a handle.

In testimony whereof I have signed this specification in the presence of two subscribing witnesses.

JOSEPH E. HAUSFELD.

Witnesses:
GEO. W. CARMANY,
CHARLES E. PFAU.